J. Branch,

Animal Trap.

No. 94,708.  Patented Sep. 14, 1869.

Witnesses,
Phil. T. Dodge
L. Hailer

Inventor,
J. Branch
By Dodge & Munn
his att'ys

United States Patent Office.

JULIUS BRANCH, OF MOOERS, NEW YORK.

Letters Patent No. 94,708, dated September 14, 1869.

IMPROVED ANIMAL-TRAP.

The Schedule referred to in these Letters Patent and making part of the same.

*To all whom it may concern:*

Be it known that I, JULIUS BRANCH, of Mooers, in the county of Clinton, and State of New York, have invented certain new and useful Improvements in Animal-Traps; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to animal-traps; and consists in a novel manner of constructing and arranging a trap in which each animal caught resets the trap for another.

In the drawing—

In constructing my trap, I first build a large box or body, A, provided at one end with a sliding door, $a$, and also with gratings $b$, for the admission of light.

Figure 1:
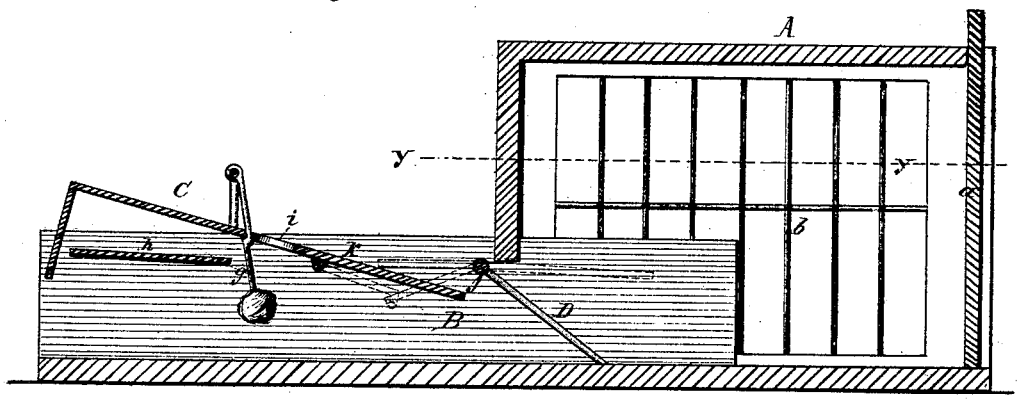
Figure 1 is a longitudinal vertical section, through the centre of my trap.
Figure 2:
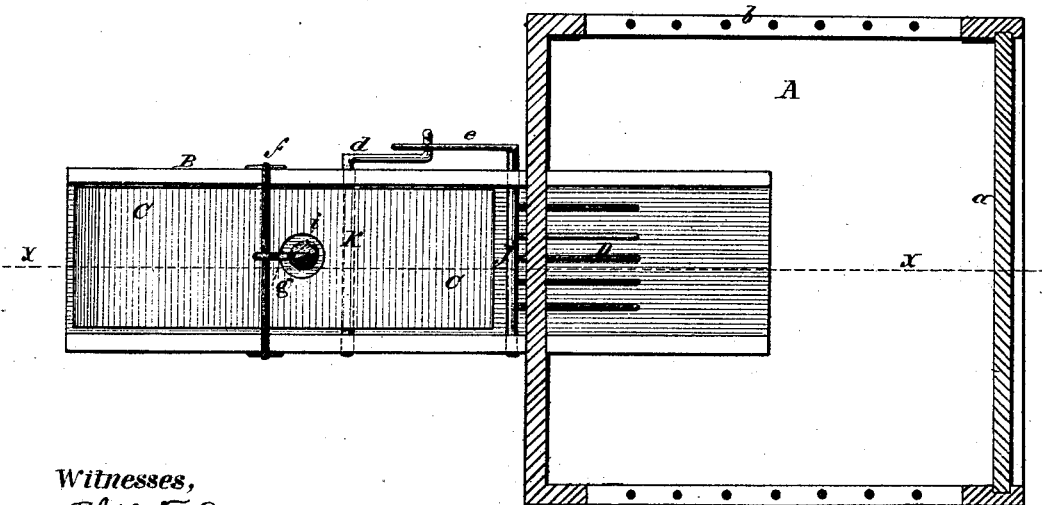
Figure 2 is a top plan view of the same.

Through one side of the box I make an opening, and insert the end of a trough or passage-way, B, as shown in figs. 1 and 2.

Across in the passage B, in line with the side of the box A, I locate a hinged grating or gate, D, hung from the rock-shaft $j$, and completely closing the passage, but the lower end of which may be raised, as shown in dotted lines in fig. 1.

Across the passage B, I place a rock-shaft, $k$, lying horizontal, and parallel with shaft $j$.

To this shaft $k$, I attach the board or drop C, extending from shaft $j$ to the outer end of the passage, and having at the outer end a depending portion, of the size of the passage, as shown in figs. 1 and 2.

On the end of shaft $k$, I form an arm, $d$, extending midway to shaft $j$, and having its end turned outward, at right angles; and on the end of shaft $j$, I form an arm, $e$, reaching forward and overlying the projecting end of arm $d$, as shown in figs. 1 and 2.

Through the drop C, just forward of shaft $k$, I make a hole, $i$, and over the passage, above the drop, I secure a bow or cross-bar, $f$, this cross-bar having attached to it a depending-stem or trigger, $g$, which extends down through the hole $i$ in the drop, and to near the bottom of the passage-way.

Near the middle of the trigger or stem, I form a shoulder, and on its lower end form a hook or barb, to which the bait can be readily secured.

My trap, thus constructed, operates as follows:

To set it, the outer end of the drop C is lifted until the shoulder of the stem $g$ engages under the edge of the hole $i$. The bait is then hooked on to the stem, and the trap is ready.

The animal, attracted by the bait, passes in at the open end of the passage B, and, seizing the bait, moves the stem, and disengaging its shoulder from the drop, allows the latter to fall, thus entrapping him securely within the passage-way.

The animal caught, in endeavoring to escape, seeing light through the grate D, passes through under it into the box A, in doing which he raises the gate D, throwing down its arm $e$, which in turn depresses arm $d$, and throws up the drop C, which is held by stem $g$, and the trap is again ready to operate.

The animal, after entering the box A, cannot return, as the gate closes after him.

Having thus described my invention,

What I claim, is—

A trap, consisting of the box A, with the spout or passage-way B, having the drop C, trigger $g$, rock-shaft $k$, with its arm $d$, and gate D, with its arm $e$, all constructed and arranged to operate substantially as described.

JULIUS BRANCH.

Witnesses:
T. HEFFERNAN,
CHAUNCEY S. BRANCH.